Patented Oct. 12, 1943

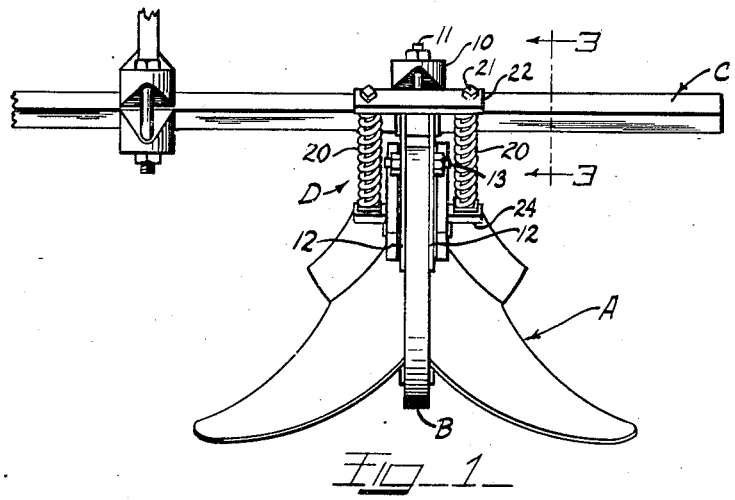

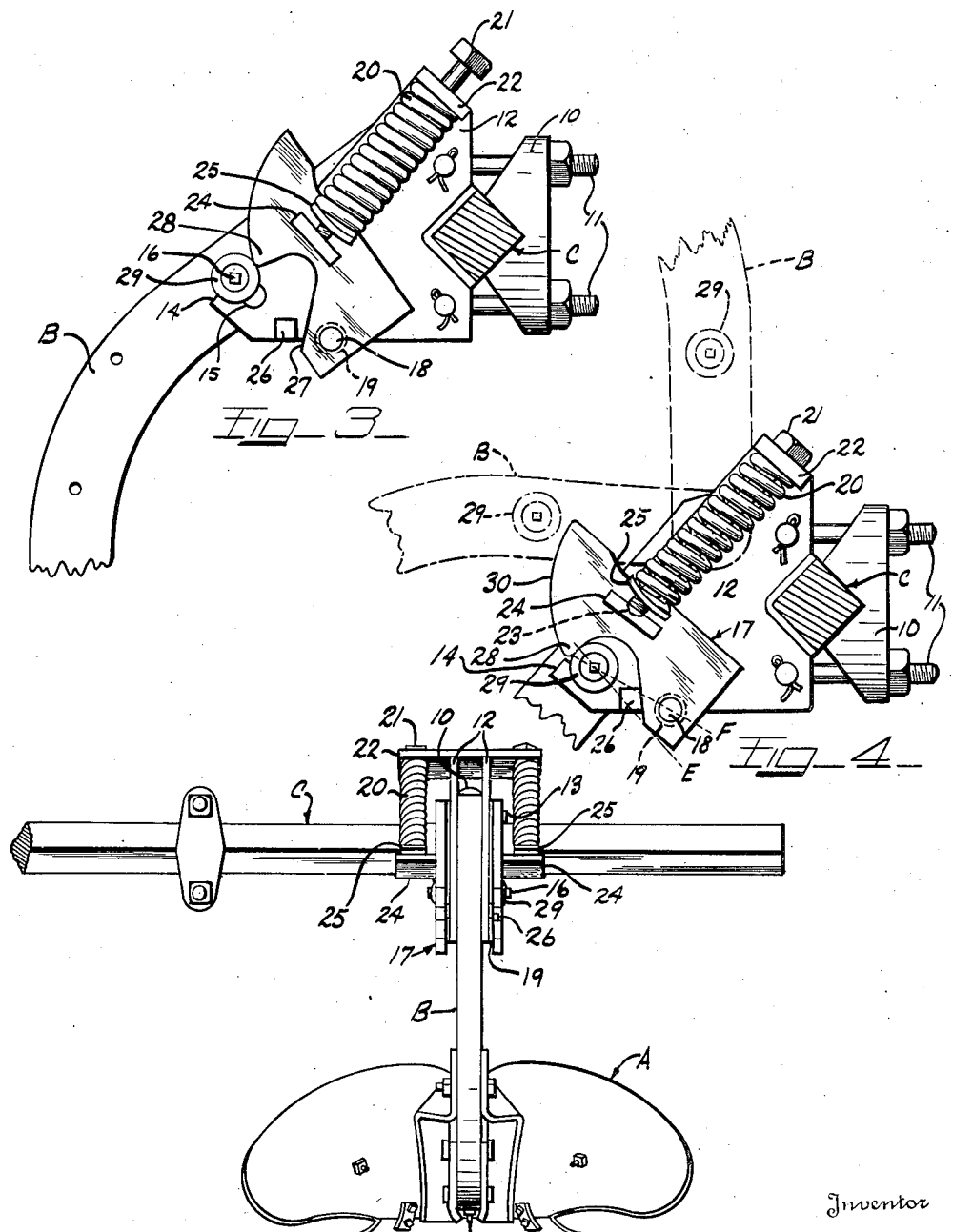

2,331,686

UNITED STATES PATENT OFFICE 2,331,686

SAFETY RELEASE FOR PLOWS AND THE LIKE

Otto E. Hintz, Jr., Moline, Ill., assignor to Minneapolis-Moline Power Implement Company, Minneapolis, Minn., a corporation of Delaware Application March 27, 1941, Serial No. 385,458

8 Claims. (Cl. 97—183)

This invention relates to improvements in automatic release devices for freeing the earth working tools of tillage implements when the tools meet with unyielding obstructions in the ground.

The main object of the invention is to provide a tool mounting and release mechanism by means of which a tillage tool, such as a middlebreaker share, may swing upwardly and rearwardly when it meets with an obstruction in the ground, and to provide for the lift of the tool high enough to clear any ordinary obstruction, or one which will pass beneath the frame of the implement itself. Another and important object is to provide release mechanism which is so constructed and arranged that the tool, after clearing the obstruction, may fall back to the ground of its own weight and be returned then to a locked or a working position by rearward movement of the implement. Still another object is to provide a tool mounting in which the rearward movement of the tool when it meets with obstruction, is in an upward direction in order thus to prevent any tendency of the tool to raise other tool units or gangs from their normal working positions.

These and other more detailed and specific objects will be disclosed in the course of the following specification, reference being had to the accompanying drawings, in which—

Fig. 1 is a plan view of my improved release mechanism as applied to the tool bar or draw bar of an implement and used in connection with a middlebreaker share.

Fig. 2 is an enlarged perspective view of the tool, the release mechanism, and a portion of the tool bar.

Fig. 3 is an enlarged vertical section along the line 3—3 in Fig. 1, showing only the upper portion of the tool beam and showing the beam at the point of release to permit the share to swing upwardly.

Fig. 4 is a similar view but showing in dotted lines several positions assumed by the tool beam as it swings upwardly free of the release mechanism.

Fig. 5 is a rear elevation of the structure shown in Fig. 1.

Referring now more particularly and by reference characters to the drawings, I have shown my invention as employed for mounting a conventional middlebreaker share, designated generally at A, secured to the upwardly and forwardly curved beam B which is pivotally connected and supported for draft purposes from a draw bar or tool C. Obviously any type of tool may be substituted for the share A, and the actual supporting and draft appliance, here represented by the tool bar C, may be any suitable part of the implement.

My improved release or trip mechanism is designated generally at D and comprises essentially a mounting unit including a clamp 10 adapted to be secured to the tool bar C by the bolts 11 and having the rearwardly extended upright side plates 12 which are disposed in transversely spaced relation as clearly shown.

The upper forward end of the beam B is loosely entered between the side plates 12 and pivotally connected thereto by the transverse pivot pin or bolt 13. This mounting will of course permit the tool beam B and share A to swing upwardly and downwardly in a generally vertical and longitudinally extending plane.

The side plates 12 extend to points below and to the rear of the pivot 13 to substantially embrace opposite sides of the beam B for some distance and the corresponding, rearwardly sloping upper edges 14 of the side plates are provided near their extremities with upwardly and rearwardly opening notches 15. A cross pin or arbor 16 is mounted through the beam B on a transverse axis and in such position that it will enter at its exposed ends into the aforesaid notches 15 and thus limit downward movement of the beam B to the point that the share A will rest at normal working position in the ground. The shape and position of the notches 15 will however, permit the beam B to swing freely upward, drawing the pin 16 from the notches.

Mounted immediately alongside and outwardly of the side plates 12, are the cam members or trip plates designated generally at 17. These trip plates 17 are pivotally mounted by a pin 18 on the side plates 12 at a point below and forwardly of the notches 15 and for this purpose I may conveniently employ a short tubular bearing 19 welded or otherwise secured crosswise on lower edges of the side plates and rotatably receiving the pin 18. The trip plates are normally rocked in a rearward direction about the axis afforded by the pin 18 by means of expansion coil springs 20 which are placed loosely over elongated bolts 21 which extend rearwardly and downwardly through a cross bar 22 secured to the plates 12 and at their extremities engage in shallow sockets 23 formed in spring rests or lugs 24 extending outwardly and rigidly from the trip plates 17 above the pivots 18. The springs 20 bear rearwardly and downwardly against nuts 25 threaded on the bolts 21 and as a result normally slide the bolts in a rearward direction through the cross bar and swing the trip plate 17 rearwardly and downwardly. This movement is limited by engagement of one of the trip plates with a stop 26, secured to one side plate 12, and the constant tension of the springs 20 may of course be varied by adjusting the nuts 25.

It may here be noted that the pin 18 is welded or otherwise rigidly secured to the trip plates so that they will at all times operate in unison.

The lower rear edges of the trip plates 17 are deeply notched or recessed as represented at 27 to provide hook portions or cam noses 28 and in the normal position of the plates the notches 27 will substantially clear the notches 15 while the hook portions 28 will stand over and to the rear of pin 16. Cam rollers 29 are journaled on the outer ends of the pin 16 in position to clear the side plates 12 and these rollers are of such diameter that they will just nicely engage lower contact surfaces of the hook portions 28 in the normal position of the parts. The trip plates 17 are further rounded off or inclined from the portions 28 in an upward and forward direction, as represented at 30.

In use, with the share A in normal working position as seen in Figures 1, 2, and 5, the hook portions 28 will overlie the rollers 29 and resist any upward movement of the share and beam B under the normal working pressures encountered by the share as it moves through the ground. However, when the share meets with an unyielding obstruction, the upward force exerted by the rollers 29 against the contacted surfaces of the hook portions will be greatly increased as will be evident. The relative positions of the pivot 13 for the tool and the pivot 18 for the trip plates is such that the center line of contact, designated at E in Fig 4, falls substantially forwardly or inwardly with respect to the end of portions 28 as contrasted to the point at which in center line of force, designated at F, engages these surfaces. As a result, while the tension exerted by the springs 20 may be, and is, sufficient to hold the trip plates in locked engagement with the rollers under normal working conditions, the increased forces operating along the line F when the share meets an obstruction will set up a component tending to rotate or oscillate the trip plates in a forward direction about their pivots 18. When this occurs, as shown in Fig. 3, the rollers 29 may clear the hook portions 28 permitting the beam B to swing upwardly and rearwardly so that the share A may clear the obstruction. In this operation, the rollers 29 roll upwardly along the arcuate surfaces 30 of the trip plate 17 holding them in forwardly swung positions until the beam B has lifted to a substantial elevation. Of course, as the rollers 29 clear the trip plates 17, the plates will be swung back rearwardly until they contact the stops 26, by the pressure of the springs 20.

As best seen in Fig. 4 the tool beam B may swing almost to a vertical position limited by its contact with the cross bar 22 and in this position the share or other tool will be elevated to a point at which it will clear any obstruction which will pass beneath the trip mechanism itself. This is an important feature and one which contributes greatly to the efficiency of my invention. Attention is further called to the fact that the pivots 13 for the beam being located well above the tool itself will cause the tripping movement of the tool to be in a rearward and generally upward direction. Any tendency of the tool to bear downwardly against the ground as it trips, and thus cause other tools or gangs, supported from the tool bar C, to be raised from their normal working depths will be largely prevented.

Obviously the weight of the tool and beam is so distributed that once the tool clears the obstruction it will normally, and of its own weight, swing back downwardly toward its normal working position. As this action occurs, the rollers 29 will first clear the upper ends of trip plates 17 as indicated in Fig. 4, but the curvature of the arcuate edges 30 is such that, as the beam B approaches its normal position, the rollers will bear against said surfaces. In this position, the point of share A will come in contact with the ground and by simply backing the implement, the resistance offered to the tool will have a tendency to swing the beam forwardly and downwardly. The rollers 29 then cam against the arcuate surfaces 30 and urge the trip plate 17 forwardly until the pin 16 enters the notches 15 and the beam reaches its normal working position. At this point, the springs 20 will again urge the trip plates 17 rearwardly and the hook portions 28 will again come into locking engagement with the rollers ready for the next operation. This feature of automatic reengagement of the tool with the locking mechanism is important inasmuch as it makes it unnecessary for the operator of the implement to dismount and carry out the operation manually.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an implement, a frame, a beam connected to the frame for swinging movements with respect thereto, a tool on the beam and adapted to be carried by said swinging movement of the beam upwardly from the ground to clear an obstruction thereon, rollers on each side of the beam, cam members pivotally supported from the frame at each side of the beam and normally engaging the rollers to prevent upward swinging movement of the beam, and spring means arranged between the frame and cam members normally urging said cam members into position for engaging the rollers but yieldable to permit the members to rock on their pivots clear of the rollers in response to pressure of the rollers on the members when the tool meets an obstruction on the ground.

2. Release and mounting mechanism for the beam of the earth working tool of an implement, comprising side plates rigidly mounted in transversely spaced upright positions on the implement, the said beam being arranged at an upper end between the side plates and pivotally supported for up and down swinging movements, a cross member on the beam, the side plates having upwardly opening notches to receive the cross member and limit downward movement of the beam, and spring pressed means engaging the cross member to restrain the beam against upward swinging movements but releasable to clear the cross member in response to upward pressure exerted on the beam when the tool meets an unyielding obstruction.

3. Mounting means for the upper end of a tool beam having a tool in its lower end, comprising means pivotally supporting said upper end of the beam and permitting upward swinging movement of the tool from its normal working position, a roller on the beam spaced from its pivoted end, a trip plate pivotally supported alongside the beam in position to clear the beam as it swings and having a hook portion adapted to overlie the roller and normally restrain the beam against said upward swinging movement, spring means yieldably urging the trip plate into engagement with the roller, and the pivot for the trip plate being so located that an upward pressure by the roller on the said hook portion, caused by the tool meeting an unyielding obstruction, will oscillate the trip plate to a position clearing said roller to thereby permit upward swinging movement of the beam and tool.

4. In an implement, a tool, a beam connected to the tool and extending upwardly and forwardly therefrom, means pivotally supporting the upper forward end of the beam and permitting upward swinging movement of the tool from its normal working level, a cam roller journaled on the beam and spaced rearwardly from the pivot thereof, a trip plate pivotally supported alongside the forward end of the beam for forward and rearward swinging movements with respect thereto, rearwardly projecting hook means on the trip plate adapted normally to overlie the roller in contact therewith and thereby restrain the beam against upward movement, spring means yieldably urging the trip plate in a rearward direction, and the respective pivots for the beam and trip plate being so located that the center line of contact between the roller and said hook means will fall forwardly of the center line of pressure exerted upwardly by the roller against the hook means whereby an increase in such upward pressure, caused by the tool meeting an unyielding obstruction, will set up a component of force sufficient to overcome said spring means and swing the trip plate forwardly clearing the hook means from the roller and permitting the beam and tool to swing upwardly.

5. In an implement having a tool and a beam extending upwardly from the tool, a mounting for the beam comprising means pivotally supporting the upper end of the beam for upward swinging movements at its lower end when the tool strikes an obstruction, trip plates pivotally supported from the implement alongside the upper end of the beam, rollers on opposite sides of the beam, the said trip plates having rearwardly projecting means adapted to overlie the rollers and restrain the beam against upward movement, springs arranged to urge the trip plates rearwardly into engaged relation with the rollers but yieldable to permit forward movement of the trip plates to clear the rollers when the tool strikes an obstruction and thereby exerts upward force sufficient to overcome the resistance of the springs, and the said trip plates having forwardly inclined edges to engage the rollers as the beam swings upwardly and to cam against said rollers to swing the plates forwardly when the beam swings back toward normal position.

6. In an implement having a tool and a beam connected thereto, a mounting device for the beam comprising a main mounting member having means pivotally supporting an upper end of the beam for up and down movements at its other end, trip plates pivotally supported on said member and operatively arranged to normally restrain the beam against upward movement but releasable to permit such movement when the tool strikes an unyielding obstruction, spring rests on the trip plates, threaded members slidably supported at forward ends and braced at rear ends against the rests, springs on said threaded members and braced at forward ends, and nuts on the rear ends of the threaded members engaging the springs whereby said springs will yieldably urge the members rearwardly against the rests and thereby normally urge the trip plates into engaged relation with the beam.

7. Releasing and mounting mechanism for the beam of an earth working implement tool, comprising spaced side members, the said beam being arranged at its upper end between said side members and pivotally supported for up and down swinging movements with respect to said members, a cross member on the beam arranged to engage the side members and limit downward swinging movements of the beam, and a spring urged member engaging the cross member to normally restrain the beam against upward swinging movements, the said spring urged member being movably mounted to clear the cross member in response to upward pressure exerted on the beam when the tool meets an obstruction in the earth.

8. In an implement having a tool and a beam connected thereto, a mounting device for the beam comprising a main mounting member having means pivotally supporting an upper end of the beam for up and down movements at its other end, trip plates pivotally supported on said member and operatively arranged to downwardly engage and normally restrain the beam against upward movement but releasable to permit such movement when the tool strikes an unyielding obstruction, and springs arranged in connection with the said mounting device and having generally rearwardly directed ends braced against the trip plates to yieldably urge the same rearwardly into engaged relation with the beam.

OTTO E. HINTZ, Jr.